United States Patent
Wang et al.

(10) Patent No.: US 9,702,243 B2
(45) Date of Patent: Jul. 11, 2017

(54) SYSTEMS AND METHODS FOR MONITORING TEMPERATURE USING A MAGNETOSTRICTIVE PROBE

(71) Applicant: Baker Hughes Incorporated, Houston, TX (US)

(72) Inventors: Ke Wang, Sugar Land, TX (US); Zhiyue Xu, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 471 days.

(21) Appl. No.: 14/267,255

(22) Filed: May 1, 2014

(65) Prior Publication Data
US 2015/0098488 A1    Apr. 9, 2015

Related U.S. Application Data

(60) Provisional application No. 61/887,191, filed on Oct. 4, 2013.

(51) Int. Cl.
*H02K 11/00* (2016.01)
*E21B 47/06* (2012.01)
(Continued)

(52) U.S. Cl.
CPC .............. *E21B 47/065* (2013.01); *G01K 7/36* (2013.01); *G01K 11/22* (2013.01); *G01K 13/00* (2013.01);
(Continued)

(58) Field of Classification Search
CPC ...................................... G01K 11/24
(Continued)

(56) References Cited

U.S. PATENT DOCUMENTS 3,580,058 A * 5/1971 Lynnworth ............ G01K 11/24
374/E11.01
3,597,316 A * 8/1971 Lynnworth ............ G01K 11/24
374/119
(Continued)

FOREIGN PATENT DOCUMENTS

EP        314249       5/1989
EP        910725       7/2003
(Continued)

*Primary Examiner* — Minh Phan
*Assistant Examiner* — Leon W Rhodes, Jr.
(74) *Attorney, Agent, or Firm* — Law Offices of Mark L. Berrier (57) ABSTRACT

Systems and methods for monitoring temperature distribution in downhole equipment using magnetostrictive probes. In one embodiment, an ESP motor has a stator with a rotor and shaft rotatably positioned within the stator. Magnetostrictive sensors are positioned within the motor. Each magnetostrictive sensor has a transducer, a probe, and electronic circuitry coupled to the transducer. The circuitry generates an initial electrical signal that is conveyed to the transducer. The signal passes through one or more coils in the transducer, generating magnetic fields that induce an acoustic signal in the probe. The acoustic signal propagates through the probe and waves are reflected from reflection points in the probe. The transducer senses the reflected acoustic waves and provides corresponding electrical signals to the circuitry, which determines timing intervals associated with the reflected waves and uses this information to determine temperatures at one or more locations in the probe (hence in the monitored equipment).

17 Claims, 7 Drawing Sheets

(51) Int. Cl.
  *G01K 7/36*      (2006.01)
  *G01K 13/00*     (2006.01)
  *H02K 11/26*     (2016.01)
  *G01K 11/22*     (2006.01)
  *G01F 23/296*    (2006.01)
  *G01F 23/24*     (2006.01)

(52) U.S. Cl.
  CPC ............ *H02K 11/26* (2016.01); *G01F 23/248* (2013.01); *G01F 23/2963* (2013.01); *G01K 2205/00* (2013.01)

(58) Field of Classification Search
  USPC .......................................................... 374/119
  See application file for complete search history.

(56) References Cited

U.S. PATENT DOCUMENTS

| | | | |
|---|---|---|---|
| 3,633,424 A * | 1/1972 | Lynnworth | B06B 1/08 310/26 |
| 3,636,754 A * | 1/1972 | Lynnworth | G01L 11/04 73/597 |
| 4,483,630 A | 11/1984 | Varela | |
| 4,541,732 A | 9/1985 | Shah | |
| 4,676,665 A * | 6/1987 | Twerdochlib | G01K 11/02 374/117 |
| 5,044,769 A | 9/1991 | Kulczyk | |
| 5,286,109 A | 2/1994 | Hanscombe | |
| 5,320,325 A | 6/1994 | Young | |
| 5,406,200 A | 4/1995 | Begin | |
| 5,488,955 A * | 2/1996 | Dias | A61B 8/12 600/459 |
| 6,047,602 A | 4/2000 | Linworth | |
| 6,230,799 B1 * | 5/2001 | Slaughter | E21B 28/00 166/177.2 |
| 6,268,911 B1 | 7/2001 | Tubel | |
| 6,281,489 B1 | 8/2001 | Tubel | |
| 6,517,240 B1 | 2/2003 | Herb | |
| 6,588,266 B2 | 7/2003 | Tubel | |
| 6,787,758 B2 | 9/2004 | Tubel | |
| 7,040,390 B2 | 5/2006 | Tubel | |
| 7,201,221 B2 | 4/2007 | Tubel | |
| 7,296,597 B1 | 11/2007 | Freyer | |
| 7,452,161 B2 | 11/2008 | Freyer | |
| 7,455,106 B2 | 11/2008 | Veneruso | |
| 7,604,049 B2 | 10/2009 | Vaidya | |
| 7,654,315 B2 | 2/2010 | Du | |
| 8,042,612 B2 | 10/2011 | Crossley | |
| 2002/0109080 A1 | 8/2002 | Tubel | |
| 2003/0196816 A1 | 10/2003 | Aronstam | |
| 2003/0205083 A1 | 11/2003 | Tubel | |
| 2004/0065439 A1 | 4/2004 | Tubel | |
| 2006/0272809 A1 | 12/2006 | Tubel | |
| 2007/0074872 A1 | 4/2007 | Du | |
| 2007/0142547 A1 | 6/2007 | Vaidya | |
| 2007/0273225 A1 * | 11/2007 | Head | F04D 13/10 310/87 |
| 2007/0284011 A1 | 12/2007 | Freyer | |
| 2007/0286682 A1 | 12/2007 | Freyer | |
| 2009/0188665 A1 | 7/2009 | Tubel | |
| 2010/0047089 A1 * | 2/2010 | Booker | E21B 47/0007 417/410.1 |
| 2013/0272898 A1 | 10/2013 | Toh | |

FOREIGN PATENT DOCUMENTS

| | | |
|---|---|---|
| EP | 1355170 | 6/2004 |
| EP | 1166428 | 12/2004 |
| EP | 954743 | 4/2005 |
| EP | 2004953 | 10/2009 |
| EP | 2013447 | 1/2010 |
| KR | 10-0467985 | 1/2005 |

* cited by examiner

SYSTEMS AND METHODS FOR MONITORING TEMPERATURE USING A MAGNETOSTRICTIVE PROBE

CROSS-REFERENCE TO RELATED APPLICATIONS

This application claims the benefit of commonly owned U.S. Provisional Patent Application 61/887,191, filed Oct. 4, 2013 by Wang, et al., which is incorporated by reference as if set forth herein in its entirety.

BACKGROUND

Field of the Invention

The invention relates generally to monitoring downhole equipment, and more specifically to systems and methods for monitoring temperature and/or temperature distribution in downhole equipment such as electric submersible pump (ESP) systems using magnetostrictive probes.

Related Art

Oil production often requires the use of artificial lift systems to recover oil and other well fluids from wells. These artificial lift systems may include, for example, ESP systems and subsea boosting systems. These systems are typically very expensive to install and operate. A lift system may, for example, cost tens of millions of dollars to install and hundreds of thousands of dollars each day to operate. The costs associated with failures and downtime in these systems are also very high.

Because of the high cost of artificial lift systems, it is very important to take steps to ensure that they are as reliable as possible and have the longest possible operational life. One of the things that can be done to improve reliability in these systems is to monitor various parameters associated with the systems in order to determine their "health". These parameters may include such things as temperature, pressure, vibration, fluid flow, fluid viscosity, voltage, current, and many others.

If the monitored parameters remain within desired operating ranges (a "green" zone), the system may continue to operate without any changes. If the monitored parameters fall outside the desired operating ranges, but are still within acceptable limits (a "yellow" zone), it may be necessary to adjust the operation of the system in some manner. This may include modifying control signals, updating operating parameters within the downhole equipment, and so on. These adjustments are intended to move the operation of the system (as indicated by the monitored parameters) back into the green operating zone. If the adjustments do not cause the parameters to return to the desired operating ranges, this may indicate that it is necessary to perform repair or maintenance on the system. If the monitored parameters fall outside the range of acceptable values (a "red" zone), it may be necessary to discontinue operation of the system, and possibly repair or replace one or more system components.

One of the key parameters that may be monitored is the temperature of the system components that are positioned downhole within a well. In some applications, the temperature can be as high as 700° F. High temperatures can be very hard on components such as motor bearings, and even materials such as electrical insulation, which may begin to break down and lose its electrically insulating properties. Conventionally, thermal sensors such as thermocouples were designed into equipment such as ESP motors to provide information on the temperature of the equipment. A thermocouple, however, can only monitor the temperature at a single point. For ESP applications, thermocouples can typically only monitor the temperatures near the ends of the motor because these are the only areas that are accessible. A large portion of the motor, especially near its center, is not accessible and consequently cannot be monitored.

It would therefore be desirable to provide means to replace the expensive fiber optics sensors in downhole equipment such as multi-section ESP motors which reduce or overcome one or more of the problems above.

SUMMARY OF THE INVENTION

This disclosure is directed to systems and methods for monitoring temperature in downhole equipment such as ESP systems using magnetostrictive probes that solve one or more of the problems discussed above. One particular embodiment comprises an ESP motor having one or more magnetostrictive sensors. The motor has a stator with a bore therethrough. A rotor which is mounted on a shaft is positioned within the bore of the stator so that it can rotate within the stator. The magnetostrictive sensors can be positioned at various locations within the motor. Each of the magnetostrictive sensors includes a transducer, a probe, and electronic components (e.g., circuitry) coupled to the transducer. The circuitry is configured to generate an initial electrical signal that is conveyed to the transducer. This generates a corresponding initial acoustic signal in the probe. The acoustic signal propagates through the probe, and when the acoustic wave reaches each of a set of reflection points in the probe, a reflected wave is propagated back toward the transducer. The transducer senses the reflected acoustic signals and generates corresponding electrical signals that are interpreted by the circuitry. The circuitry determines timing intervals between the initial acoustic wave and the reflected waves, and uses this information to determine temperatures at one or more locations in the probe (hence in the motor).

The magnetostrictive sensors can be placed at various locations in the ESP motor (or in other equipment in alternative embodiments). For example, a sensor can be positioned so that its probe extends into a hollow interior of the motor's shaft, so that the probe remains stationary while the shaft rotates within the bore of the stator. Magnetostrictive sensors can also be positioned so that their probes are within the slots in the stator, adjacent to the windings of magnet wire that are positioned in the slots. Magnetostrictive sensors can also be positioned so that their probes extend between the housing of the stator and the stack of stator laminations. Magnetostrictive sensors can also be positioned with their probes embedded into the stator laminations. These sensors can then be used to sense temperatures at different locations along the lengths of the probes. The circuitry may be configured to determine the temperature between a pair of reflection points by identifying a relative time shift of the reflected signals from the two reflection points and converting the relative time shift to a corresponding temperature reading (based on the propagation speed of the acoustic wave through the probe as a function of temperature). The probes can sense temperatures over complex surfaces at non-colinear locations.

The probes of the magnetostrictive sensors can be made of various types (e.g., ferromagnetic) of material. Each probe can have one or more reflection points, such as notches or stress points (e.g., weld locations) in the probe. The notches may, for example, have triangular, rectangular, circumferential, or any other suitable configuration. The transducers of the magnetostrictive sensors may have various configurations as well. For instance, some embodiments use magnets in combination with one or more coils, while others are magnet-less transducers. In one embodiment, a transducer uses multiple coils that are wound in opposite directions (e.g., right-handed and left handed windings). The coils are connected in series, and are axially displaced from each other so that the acoustic wave induced by each coil is in phase with the acoustic waves induced by the other coils, thereby strengthening the overall acoustic wave in the probe.

An alternative embodiment of the invention may comprise a magnetostrictive sensor. The sensor may, for example, utilize a magnet-less transducer positioned near the end of a suitable wire probe. The transducer may use multiple, serially, connected coils to induce acoustic waves in the probe. The coils may be wound in opposite directions to generate axially opposed magnetic fields. The coils (whether wound in the same direction or in the opposite direction) can be axially displaced from each other by amounts that cause the acoustic waves generated by each coil to be in phase with the acoustic waves generated by the other coils.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as exemplified by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

The invention includes systems and methods for temperature and/or temperature distribution measurement in downhole environments that may have extremely high temperatures and pressures. These systems and methods involve the use of magnetostrictive sensors that may be implemented in wells and in downhole tools such as ESP systems. These magnetostrictive sensors provide a simple and rugged means to sense temperatures at multiple locations, both internal and external to downhole tools.

In one embodiment, magnetostrictive sensors are positioned in several locations within an ESP motor. The sensors may be positioned, for example, at the axis of the motor's shaft, within one of the stator slots, within the body of the stator itself, and between the stator body and the stator housing. Each sensor includes a thin magnetostrictive probe which is coupled to a magnetostrictive transducer. The magnetostrictive transducer generates an acoustic wave that propagates through the probe. The probe has one or more reflection points (e.g., notches or other stress points) fabricated using Electrical Discharge Machining (EDM), laser, and other methods, each of which generates a reflection of the acoustic wave in the probe, and provides a corresponding temperature indication. The transducer senses the reflections of the acoustic wave and provides this information to processing circuitry that determines the temperature and/or temperature distribution along the probe based on the timing of the reflections and the known dimensions of the probe and the reflecting points.

The magnetostrictive transducer and probe may be constructed using only metal components, enabling them to operate at extremely high temperatures (e.g., over 1000° F.) and pressures. The sensors are therefore very robust, and can provide long-term, accurate monitoring of temperatures in harsh downhole environments. Individual magnetostrictive sensors can provide temperature profiles that include multiple points over complex surfaces, and in confined spaces.

Figure 1:
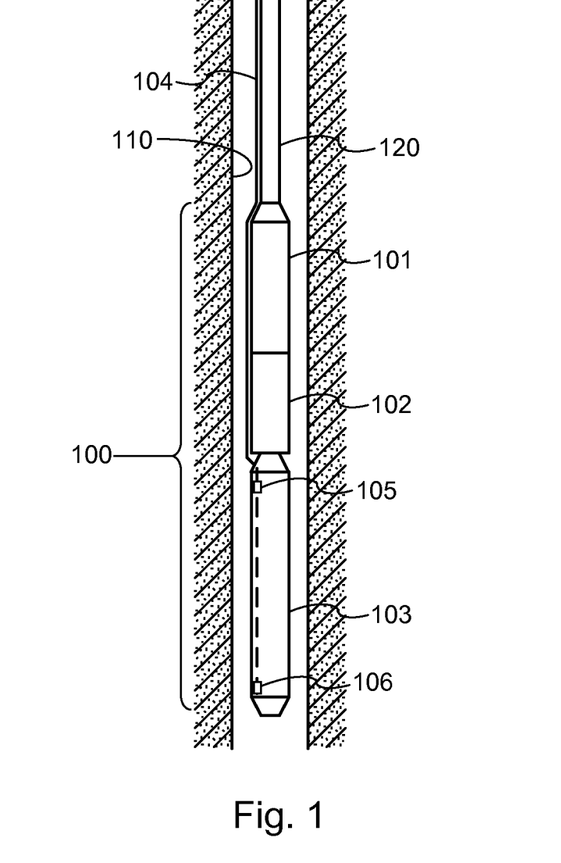
FIG. 1 is a diagram illustrating an ESP system installed in a well in accordance with one embodiment.

Referring to FIG. 1, a diagram illustrating an ESP system installed in a well is shown. ESP system 100 is installed within the bore 110 of a well. The well may be a subsea well or a surface well. In this embodiment, ESP system 100 is suspended in the well from production tubing 120. ESP system 100 includes a pump 101, a seal 102 and a motor 103. A power cable 104 couples surface equipment (not shown) to ESP system 100. Cable 104 may carry data signals between the surface equipment and ESP system 100, as well as providing power from the surface equipment to the ESP system.

Because of the increasing costs of installing, maintaining and operating artificial lift systems such as ESP system 100, it is important to monitor conditions relating to operation of these systems. One of the operating conditions that is very important in assessing the health of an artificial lift system is the temperature of the system. The operating temperature of the system can be measured in various ways. Because of the problems associated with conventional temperature sensors such as thermocouples (e.g., single-location sensing, and lack of robustness), ESP system 100 incorporates magnetostrictive sensors to sense the temperature at multiple points within the system. In particular, motor 103 includes multiple sensors (105, 106) to sense temperatures at various locations in the motor. Although sensors 105 and 106 are depicted as blocks in FIG. 1, the sensors (and particularly the probes of the sensors) are elongated, as will be described in more detail below.

Figure 2:
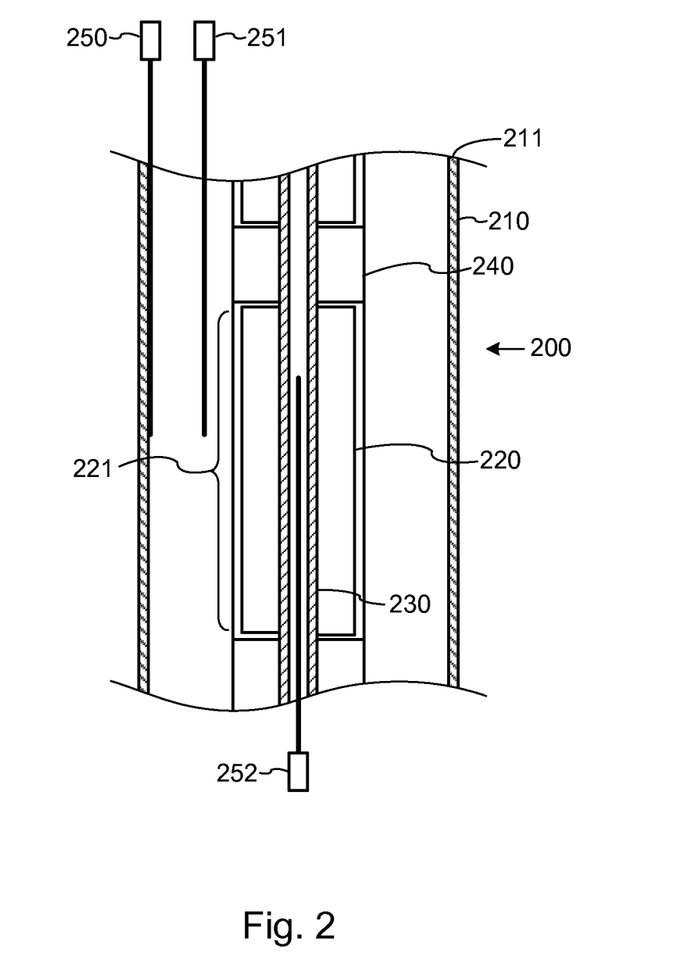
FIG. 2 is a diagram illustrating the structure of an exemplary motor suitable for use in an ESP system in accordance with one embodiment.

Referring to FIG. 2, a diagram illustrating the structure of an exemplary motor suitable for use in an ESP system is shown. As depicted in this figure, motor 200 has a stator 210 and a rotor 220. Stator 210 is generally cylindrical, with a coaxial bore that runs through it. Stator 210 is formed by stacking a set of circular laminations together and pressing the stacked laminations into a housing 211. Rotor 220 is coaxially positioned within the bore of stator 210. Rotor 220 is attached to a shaft 230 that is coaxial with the rotor and stator 210. In this example, rotor 220 includes multiple sections (e.g., 221), where bearings (e.g., 240) are positioned at the ends of each section. The bearings 240 support shaft 230, and consequently rotor 220, within the bore of stator 210 and allow the rotor and shaft 230 to rotate within the stator.

The motor includes magnetostrictive sensors that sense temperatures in various locations. In one embodiment, the temperature sensing probes are positioned between the stator housing and the stator core (250), within the stator core and/or slots in the stator core (251), and at the axis of the shaft that runs through the bore of the stator (252).

Figure 3:
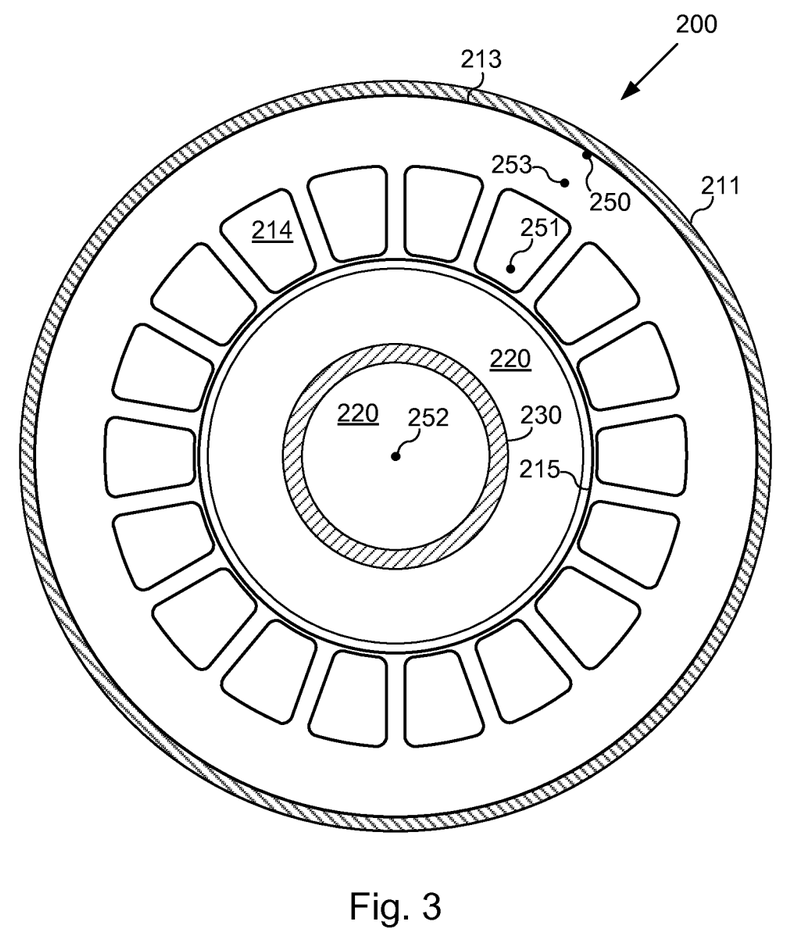
FIG. 3 is a diagram illustrating a cross-sectional view of an ESP motor in accordance with one embodiment.

Referring to FIG. 3, a diagram illustrating a cross-sectional view of an ESP motor is shown. As shown in this figure, the motor includes stator housing 211 into which the stack of stator laminations (e.g., 213) are pressed. Each of the stator laminations has a set of apertures therethrough (e.g., 214). When the laminations are stacked together, the apertures are aligned so that they form passageways, or "slots" through the stator core. Windings of magnet wire (not shown in the figure) are positioned in the slots of the assembled stator. In addition to the slot apertures, each lamination includes a central aperture (215) which forms a bore through the stator. The rotor (220) is positioned within bore 215 of the stator. Rotor 220 is coupled to shaft 230 so that they rotate together within the bore of the stator.

The motor depicted in FIG. 3 includes four different magnetostrictive sensors. The probes of these sensors are positioned at different locations within the motor to sense the temperatures at these different locations. Each of the sensors includes a probe that is a thin, elongated piece of metal or other suitable material. The probes run parallel to the axis of the motor (into the page in FIG. 3), so only a small cross section of each probe appears in the figure. As noted above, one probe (250) is positioned between the stator housing and the stator core. A groove may be formed in the outer perimeter of each lamination to accommodate the probe. Another probe (251) is positioned within one of the stator slots. This probe is positioned alongside the magnet wire in the slot (although it may be separated from the wire by an insulator). Another of the probes (252) is positioned near the axis of the shaft (which is coaxial with the rotor and stator). Another probe (253) is positioned within the stator core. A passageway through the stator core may be formed by punching a small hole in each of the stator laminations. A single vertically positioned probe is able to fully map the temperature distribution along the vertical length of the probe, which could be more than 10 m (33 ft). Full scale radial temperature mapping can be realized by positioning four magnetostrictive sensors that are distributed in the radial direction.

The transducer for sensor 252 may be positioned at the bottom of the motor, with the probe extending into the open lower end of the shaft. This allows the shaft to rotate around the probe, which remains substantially stationary. The transducers for sensors 250 and 251 are depicted in FIG. 2 as being positioned near the top of the motor with the corresponding probes extending downward into the stator, but the transducers and probes may be positioned in other locations, as may be necessary or convenient in alternative embodiments.

Figure 4A:
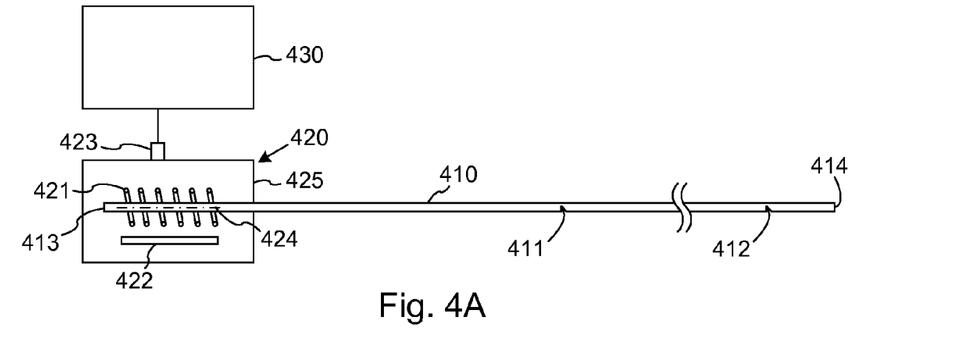
FIGS. 4A-4G are diagrams illustrating the structure of a magnetostrictive temperature sensor in accordance with several different embodiments.

Referring to FIG. 4A, a diagram illustrating the structure of a magnetostrictive temperature sensor in accordance with one embodiment is shown. In this embodiment, sensor 400 includes three primary components: a probe 410, a transducer 420, and processing circuitry 430. Probe 410 is an elongated metal rod or wire. The probe may, for example, have a diameter of less than one millimeter, and a length of 10 m or longer. The probe is preferably made of a ferromagnetic metal alloy, such as Ni—Fe. The probe may alternatively be made of materials such as elements in Group IVB of the periodic table of elements (such as titanium), Group VIIB (such as rhenium), and Group VIIIB (such as iron, nickel, rhodium). Still other materials, including magnetic alloys such as Remendur (an iron alloy) and Vicalloy (a vanadium-iron-cobalt alloy), stainless steel, nickel alloys, thoriated tungsten may also be used for the probe. The probe need not be straight, and may be conformed to complex surface to measure temperatures at locations that are not co-linear.

A proximal end 413 of probe 410 extends into the housing 425 of transducer 420. A coil 421 is positioned around the proximal end of probe 410, with the probe along the axis 424 of the coil. A magnet 422 is positioned outside coil 421 adjacent to a first side of the coil. As used herein, the "inside" or "interior" of the coil refers to the generally cylindrical volume between the turns of the coil and centered on axis 424, while the "outside" or "exterior" of the coil refers to the remaining volume, which generally surrounds the coil and excludes the cylindrical interior volume.

The coil is coupled through a connector 423 to processing circuitry 430. Processing circuitry 430 is configured to generate an electrical signal that is applied to coil 421. The signal may, for example, be a pulse, a square wave, or any other suitable waveform. When the electrical signal passes through coil 421, it causes magnetic fields to be generated around the wires of the coil. These changing magnetic fields cause the metal at the end of probe 410 within transducer 420 to expand and contract, which sends an acoustic wave through the probe, from the transducer to the opposite end of the probe. Processing circuitry 430 is also configured to measure signals generated by reflections of the acoustic wave.

Probe 410 has a plurality of notches (e.g., 411, 412) or other types of structures that produce reflections in the probe. As the acoustic wave reaches each notch, a reflection is created in the probe. This reflection is a smaller acoustic wave that travels back toward the transducer. Consequently, there is a reflected wave corresponding to each of the notches. There is also a reflected wave that is created when the original acoustic wave reaches the distal end 414 of the probe.

When a reflected acoustic wave returns to the transducer, a current is induced in coil 421. The current in coil 421 is sensed by circuitry 430, which interprets fluctuations in the current and identifies the reflected waves. Circuitry 430 determines the timing of the reflected waves and uses this information to determine the temperature(s) of the probe. When there are multiple notches in the probe, circuitry 430 may be configured to determine the temperature of the probe between each successive pair of notches, so a single sensor can be used to determine the temperature at particular locations, and can also map the temperature along the length of the probe.

The speed at which each of the waves travels through the probe is dependent upon the temperature of the probe, as well as the specific material of the probe. Since the material of the probe and the geometry of the probe (specifically distance between the transducer and each of the notches) are known, the temperature of the probe can be determined from the time that elapses between the instantiation of the original acoustic and the return of the reflected waves.

As noted above, the choice of the material for the probe affects the propagation of the acoustic wave through the probe. In addition to having the desired acoustic velocity characteristics, the material preferably has strong magnetostrictive characteristics, resistance to corrosion from materials which will be in contact with the probe, and appropriate mechanical characteristics, such as hardness, strength, thermal expansion coefficient, etc. The notches (or other structures) of the probes may have varying shapes (e.g., rectangular, rounded, or V-notches), varying depths, and varying surface finishes, each of which may affect the manner in which the acoustic wave is reflected from the structure back to the transducer. The notches may be formed using any suitable fabrication technique, including laser or EDM techniques. As an alternative to notches, the probe may use stress points to create reflections in the probe. For instance, points at which probe segments are welded together (e.g., by micro-TiG welding or compression welding) can cause reflections of acoustic waves as they propagate through the probe. A choice of ferromagnetic materials for the probe allows it to be inserted in the body of the stator without substantially affecting the magnetic properties and performance of the stator.

Figure 4B:
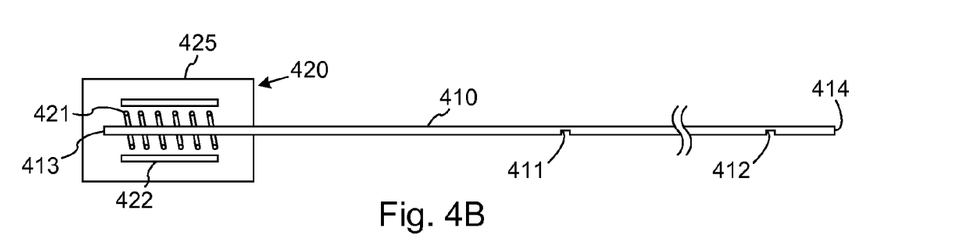
Figure 4C:
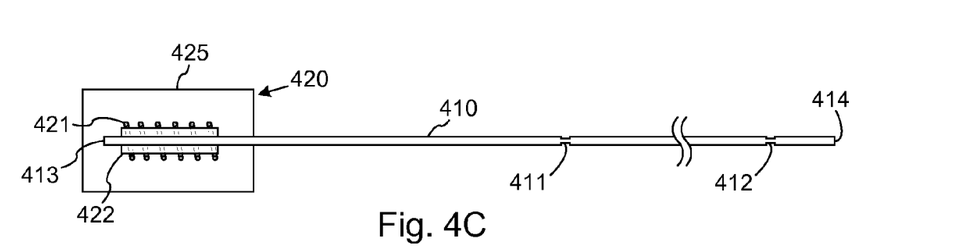
Figure 4D:
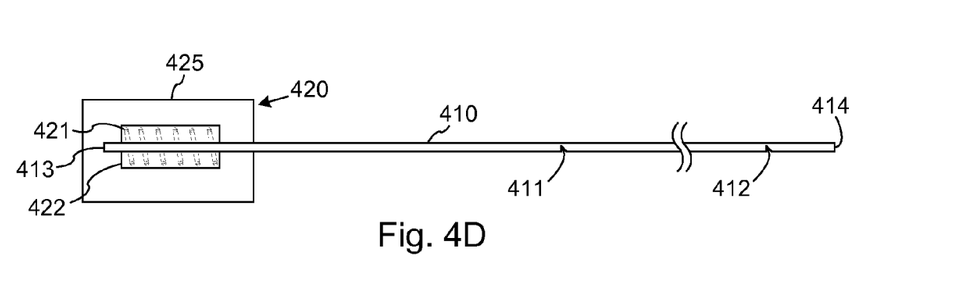
Figure 4E:
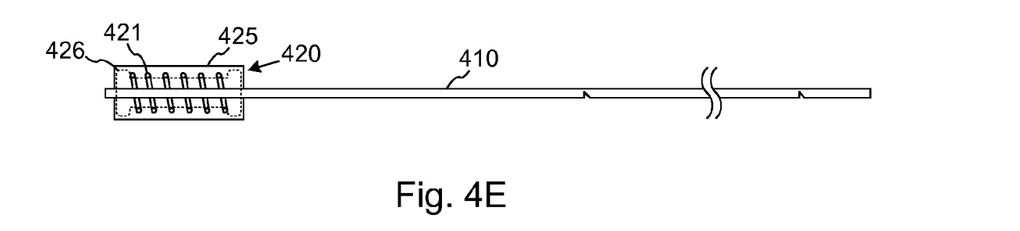
Figure 4F:
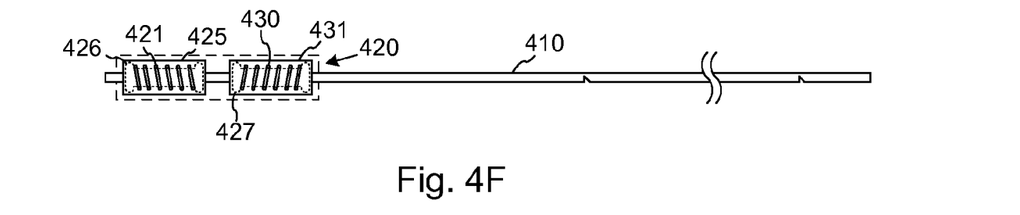
Figure 4G:
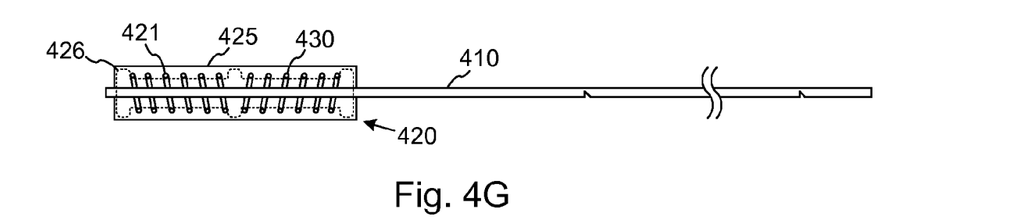

Referring to FIGS. 4B-4G, a set of diagrams illustrating the structures of alternative magnetostrictive transducers and probes are shown. FIGS. 4B-4D depict sensors in which the magnetostrictive transducers utilize combinations of magnetic coils and magnets to generate acoustic waves in the probe. FIGS. 4E-4G depict sensors in which the magnetostrictive transducers utilize one or more magnetic coils to generate acoustic waves in the probe without the use of a separate magnet. The elimination of the magnet in these embodiments may allow the transducer to be more compact, which in turn allows the magnetostrictive sensor to be more easily incorporated into the design of an ESP motor or other downhole equipment.

In FIG. 4B, transducer 420 has a pair of magnets 422 that are positioned on opposite sides of coil 421. Probe 410 is positioned coaxially in the center of coil 421. In this embodiment, probe 410 has rectangular notches 411, 412 in one side of the probe, instead of the triangular notches shown in FIG. 4A. In FIG. 4C, transducer 420 has a magnet 422 that is positioned within coil 421. In this embodiment, probe 410 has rectangular notches 411, 412, but the notches extend all the way around the circumference of the probe. In the embodiment of FIG. 4D, transducer 420 has coil 421 embedded in magnet 422. In this embodiment, probe 410 has triangular notches 411, 412.

Referring to FIG. 4E, an embodiment which does not have a permanent magnet is shown. In this embodiment, coil 421 is positioned coaxially with probe 410 within housing 425. A spool or spacer (426) may be used to support coil 421 within housing 425. This type of spacer may also be used in embodiments that employ magnets in addition to coils. The spacers are not necessary in all embodiments.

The embodiment of FIG. 4E uses a single coil (421) that is adjustable between a few mm and tens of mm long. The length of the coil may be optimized to increase the strength of the acoustic wave that is generated in probe 410 when an electrical signal is applied to the coil. If the length of the coil is too short, there may be insufficient interaction between the magnetic fields of the coil with the probe to generate a strong acoustic wave. The more out-of-phase the components are, the less the components tend to be additive, and the weaker the acoustic wave will be.

Referring to FIG. 4F, an embodiment of transducer 420 that uses two oppositely-wound coils is shown. In this embodiment, coil 421 is wrapped in a first circumferential direction (e.g., left-handed helix). Coil 430, on the other hand, is wrapped in the opposite circumferential direction (e.g., in a right-handed helix). Coils 421 and 430 are connected in series, with one end of each coil connected to the other. As a result, when a signal is applied to the coils, the magnetic field generated at the center of coil 421 (where probe 410 is positioned) is oriented in a first axial direction (parallel to the axis of the coil), while the magnetic field generated at the center of coil 430 is oriented in the opposite axial direction (again parallel to the axis of the coil). Coil 421 is supported by a spool 426 within a first housing 425. Coil 430 is supported by spool 427 within a second housing 431.

Because the axial component of the magnetic field generated by coil 430 is opposite that of coil 421, it generates an acoustic wave component in probe that is 180 degrees out of phase with the acoustic wave component generated by coil 421, but is axially displaced from the acoustic wave component generated by coil 421. The axial displacement of the respective acoustic wave components is equal to the axial displacement of the two coils. The coils are therefore positioned so that the excited acoustic waves of coil 421 and 430 are in phase, resulting in increased strength of the overall acoustic wave generated by the pair of coils. In one embodiment, the two coils are less than 10 mm long, and the axial separation between them is adjustable.

Referring to FIG. 4G, a third embodiment of transducer 420 is shown. In this embodiment, two oppositely wound coils (421, 430) are used. Coils 421 and 430 are approximately the same size used in the embodiment of FIG. 4E. The coils are positioned end-to-end, with a common spool or spacer 426 supporting the coils. The axial dimension of the spacer is calculated to ensure the excited acoustic waves of coil 421 and 430 are in phase.

Referring to FIGS. 5A-5D, four functional block diagrams illustrating various possible configurations of multiple-coil transducers are shown. In each of these figures, the coils are identified as either "+" coils or "−" coils. In each figure, a "+" coil is wound in a first direction, and a "−" coil is wound in an opposite direction. Thus, if the "+" coil is wound in a right-handed fashion, the "−" coil is wound in a left-handed fashion. Conversely, if the "+" coil is wound in a left-handed fashion, the "−" coil is wound in a right-handed fashion.

Figure 5A:
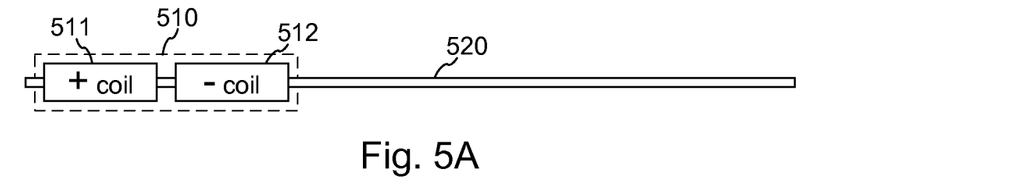
FIGS. 5A-5D are functional block diagrams illustrating various possible configurations of multiple-coil transducers in various embodiments.

Referring to FIG. 5A, a magnetostrictive sensor includes a transducer 510 and a probe 520. Transducer 510 has two coils, 511 and 512. Coil 511 is a "+" coil that is wound in a first direction, and coil 512 is a "−" coil that is wound in the opposite direction. Coils 511 and 512 are axially displaced by an amount that places them a half-period ($\pi$) apart in the phase domain, as described above. Because coils 511 and 512 are oppositely wound, the acoustic wave components induced by these coils in probe 520 are in phase and are thereby additive.

Figure 5B:
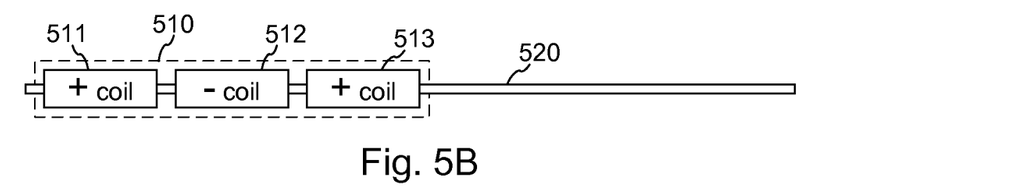

Referring to FIG. 5B, transducer 510 includes three coils, 511, 512 and 513. Coils 511 and 513 are "+" coils, while coil 512 is a "−" coil. Each successive one of coils 511-513 is axially displaced by an amount equal to a half-period ($\pi$) in the phase domain. As a result, the acoustic wave components induced in probe 520 by each of coils 511-513 are in phase. These components are thereby additive.

Figure 5C:
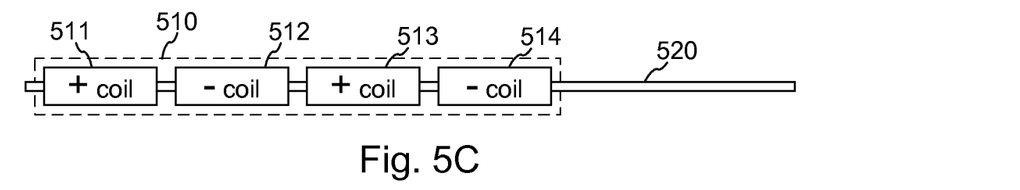
Figure 5D:
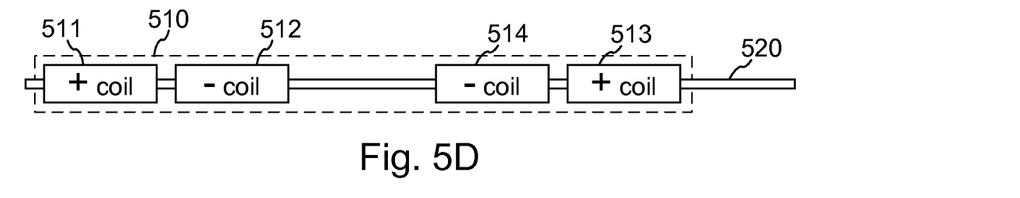

Each of the embodiments of FIGS. 5C and 5D uses a set of four coils (511-514) in transducer 510. In each embodiment, two of the coils are "+" coils, and two are "−" coils.

In the embodiment of FIG. 5C, the "+" coils and "−" coils alternate. Each successive coil is axially displaced by an amount equal to a half-period ($\pi$) in the phase domain, so that the acoustic wave components induced in probe 520 by each of coils 511-514 are in phase, and are thereby additive. In the embodiment of FIG. 5D, starting from the left side of the figure, there is a "+" coil, then two "−" coils, and finally a second "+" coil. It should be noted, however, that each of the "+" coils is axially spaced by a multiple of $\pi$ so that they are in phase with each other. Likewise, each of the "−" coils is axially spaced by a multiple of $2\pi$ in the phase domain so that they are in phase with each other. The "+" coils are shifted with respect to the "−" coils by $\pi$ in the phase domain so that the acoustic wave components of the "+" coils are in phase with the acoustic wave components of the "−" coils. As a result, all of the acoustic wave components are in phase and are additive.

The various embodiments of the magnetostrictive transducer described above use from one to four coils to induce an acoustic wave in the probe. It should be noted that the embodiments of the present invention are not limited to four coils—more coils may be used. As a practical matter, however, additional coils require additional space, so it may be desirable to use the minimum number of coils that provide the desired signal strength.

Figure 6:
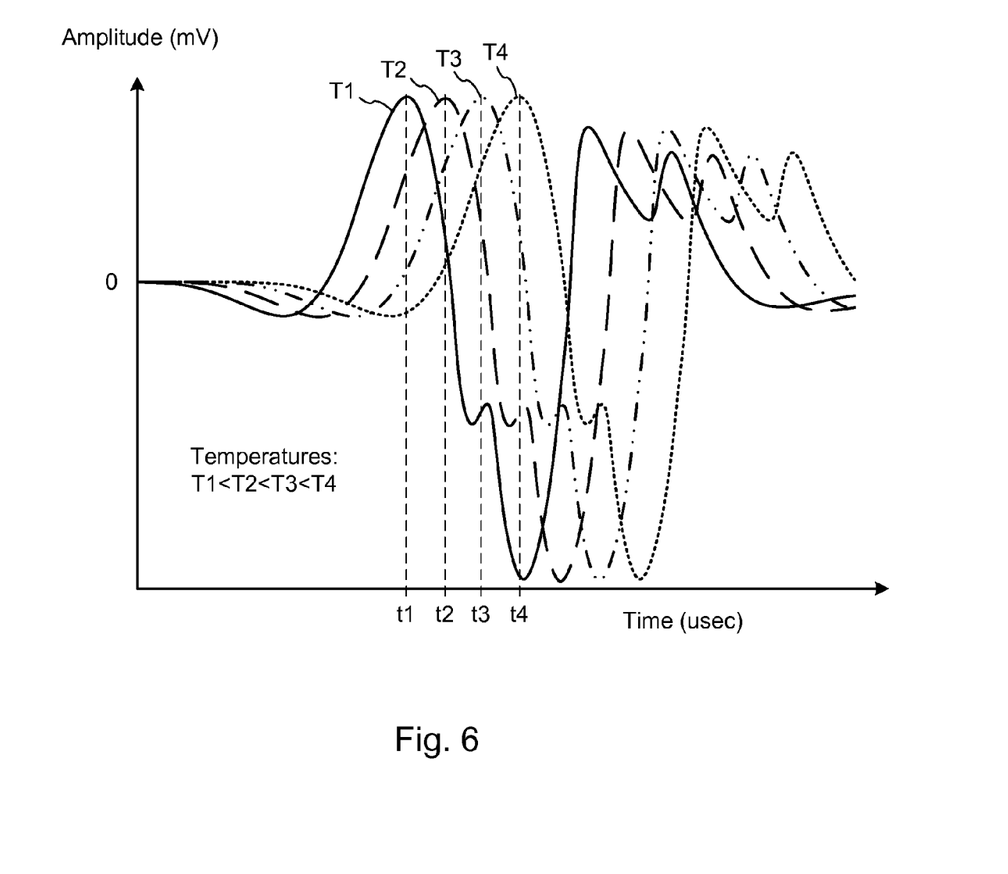
FIG. 6 is a diagram illustrating the effect of temperature on a reflected pulse in accordance with one embodiment.

Referring to FIG. 6, a diagram illustrating the effect of temperature on a reflected pulse is shown. FIG. 6 depicts a plot of a reflected wave. Each of the four different waveforms in the figure represents the wave reflected from the same notch in the probe of the magnetostrictive sensor. Each of the waveforms corresponds to a different temperature (Tn). Temperatures T1-T4 may correspond, for example, to temperatures of 50° C., 100° C., 150° C., and 200° C., respectively.

It can be seen in FIG. 6 that, when the probe is at temperature T1, the reflected wave (depicted by the solid line) has a peak at time t1. In other words, if the original acoustic wave generated by the transducer has a peak at time t0, a temperature rise ($\Delta T1 = T1 - T0$) causes a time shift (i.e., t1−t0) of the same peak.

When the probe is at temperature T2, the reflected wave is depicted by the dashed line. This waveform has a peak at time t2. A temperature rise ($\Delta T2 = T2 - T0$) causes a time shift (i.e., t2−t0) of the same peak. Thus, it takes an amount of time t2−t0 for the acoustic wave generated by the transducer to travel from the transducer to the notch, and for the reflection from the notch to return to the transducer. Because acoustic waves typically travel more slowly through materials at higher temperatures (and because $\Delta T2$ is larger than $\Delta T1$), the interval t2−t0 is greater than the interval t1−t0.

The waveforms corresponding to temperatures T3 and T4 behave similarly. Since T3 is greater than T1 and T2, the acoustic wave travels through the probe more slowly than in the case of temperatures T1 and T2, and the reflected wave does not return to the transducer until time t3. Likewise, T4 is greater than T1, T2 and T3, so the acoustic wave travels through the probe more slowly than in the case of temperatures T1, T2 and T3, and the reflected wave does not return to the transducer until time t4. Different signal analysis algorithms may be developed for optimal accuracy in determining these time readings.

As noted above, the probe may have multiple notches, each of which causes a separate reflected wave to be created. For each successive pair of notches, the paths of the waves through the probe are the same, except for the portion of the probe between the notches. Consequently, the timing difference between the corresponding reflected waves is essentially a linear function of temperature change at the portion of the probe between the notches. The transducer can therefore sense the successive reflected waves, determine the timing differences between them, and compute the temperature of each successive portion of the probe.

The transducers of the sensors may vary from the configuration depicted in FIGS. 4A-4D. The material of the transducer may be selected from a variety of materials that are suitable for the particular application in which it will be implemented. The design of the transducer may affect the sensitivity of the transducer to reflected acoustic waves and may therefore affect the effective range of the probe and notches therein. The design of the transducer may also affect the signal quality and/or signal-to-noise ratio of the signals generated from the reflected acoustic waves.

The circuitry coupled to the transducers of the sensors may use any of a variety of suitable algorithms for sensing, identifying and determining the timing of the reflected acoustic waves. Likewise, any suitable algorithm may be used to determine the temperature(s) of the probe from the sensed timing of the reflected waves. The circuitry may be configured to collect baseline or reference data, and may take steps to remove background noise or interference.

While the embodiments described above are implemented in ESP motors, alternative embodiments may be implemented in various other types of downhole equipment that is used in similarly harsh environments. Additionally, even in ESP motor implementations, there may be many variations of the specific features described above. For instance, the magnetostrictive sensors may be positioned in other locations, the transducers may utilize different configurations, the probes may have different dimensions, etc.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention, as detailed within the following claims.

What is claimed is:

1. An ESP motor comprising:
   a stator having a bore therethrough;
   a rotor mounted on a shaft, wherein the rotor and shaft are positioned within the bore of the stator, wherein the rotor and shaft rotate within the bore of the stator; and
   one or more magnetostrictive sensors positioned within the motor;
   wherein each of the magnetostrictive sensors includes a magnetostrictive transducer, a magnetostrictive probe, and electronic components;

wherein the electronic components are configured to generate an initial electrical signal that is conveyed to the transducer;

wherein the transducer is configured to generate an initial acoustic signal in the probe responsive to the initial electrical signal;

wherein the transducer is configured to sense one or more reflected acoustic signals that are reflected from one or more reflection points in the probe, and to generate, for each of the reflected acoustic signals, an induced electrical signal corresponding to the reflected acoustic signal;

wherein the circuitry is configured to determine timing intervals between one or more pairs of the initial and induced electrical signals and to determine temperatures at one or more locations in the probe and corresponding locations in the motor based on the timing intervals, wherein at least a first one of the magnetostrictive sensors is positioned so that the corresponding probe extends into a hollow interior of the shaft, wherein the probe remains stationary while the shaft rotates within the bore of the stator.

2. The ESP motor of claim 1, wherein at least one of the magnetostrictive sensors is positioned so that the corresponding probe is within one of a plurality of slots in the stator adjacent to one or more windings of magnet wire that are positioned in the slot.

3. The ESP motor of claim 1, wherein at least one of the magnetostrictive sensors is positioned so that the corresponding probe extends between a housing of the stator and a plurality of stator laminations.

4. The ESP motor of claim 1, wherein at least one of the magnetostrictive sensors is positioned so that the corresponding probe is embedded into a plurality of stator laminations.

5. The ESP motor of claim 1, wherein:
at least a second one of the magnetostrictive sensors is positioned so that the corresponding probe is within one of a plurality of slots in the stator adjacent to one or more windings of magnet wire that are positioned in the slot;
at least a third one of the magnetostrictive sensors is positioned so that the corresponding probe extends between a housing of the stator and a plurality of stator laminations; and
at least a fourth one of the magnetostrictive sensors is positioned so that the corresponding probe is embedded into a plurality of stator laminations.

6. The ESP motor of claim 1, wherein at least one of the magnetostrictive sensors is configured to determine a temperature profile along a length of the corresponding probe, wherein the profile includes temperatures at a plurality of locations in the probe.

7. The ESP motor of claim 6, wherein the at least one of the magnetostrictive sensors is configured to determine one or more individual temperatures at specific locations of the probe in addition to determining the temperature profile along a length of the probe.

8. The ESP motor of claim 1, wherein the probe of at least one of the magnetostrictive sensors is configured to sense temperatures over a complex surface at non-colinear set of locations.

9. The ESP motor of claim 1, wherein the probe of at least one of the magnetostrictive sensors comprises a ferromagnetic material.

10. The ESP motor of claim 1, wherein the one or more reflection points in the probe of at least one of the magnetostrictive sensors comprise one or more structures selected from the group comprising triangular notches, rectangular notches, circumferentially extending notches and welding joints.

11. The ESP motor of claim 1, wherein the magnetostrictive transducer of each of the magnetostrictive sensors includes at least one magnet and a coil, wherein the circuitry is coupled to the coil, wherein the initial electrical signal induces a magnetic field in the coil and thereby creates the initial acoustic signal in the probe, and wherein the reflected acoustic waves create magnetic fields that generate the induced electrical signals.

12. The ESP motor of claim 11, wherein in at least one of the transducers, a proximal end of the probe is positioned within an interior of the coil near an axis of the coil, and wherein the at least one magnet includes a first magnet which is exterior to the coil and adjacent to a first side of the coil.

13. The ESP motor of claim 11, wherein in at least one of the transducers, a proximal end of the probe is positioned within an interior of the coil near an axis of the coil, and wherein the at least one magnet includes a first magnet which is exterior to the coil and adjacent to a first side of the coil and a second magnet which is exterior to the coil and adjacent to a second side of the coil opposite the first side.

14. The ESP motor of claim 11, wherein in at least one of the transducers, a proximal end of the probe is positioned within an interior of the coil near an axis of the coil, and wherein the at least one magnet includes a first magnet which is interior to the coil and substantially coaxial with the coil.

15. The ESP motor of claim 11, wherein in at least one of the transducers, a proximal end of the probe is positioned within an interior of the coil near an axis of the coil, and wherein the coil and the proximal end of the probe are embedded in the magnet.

16. The ESP motor of claim 1, wherein for each of the magnetostrictive sensors, the circuitry is configured to store or communicate data to surface equipment, and wherein the circuitry is configured to determine the temperature between each pair of reflection points by identifying a relative time shift of each reflected signal from the reflection points or a distal end of the probe and converting the relative time shift to a corresponding temperature reading based on a relationship of time shift and temperature for the probe.

17. A method for measuring temperatures in a motor, the method comprising:
positioning one or more magnetostrictive sensors within a motor,
wherein the motor has a stator and a rotor, wherein the rotor is mounted on a shaft and positioned within the bore of the stator, wherein the rotor and shaft rotate within the bore of the stator, wherein at least a first one of the magnetostrictive sensors is positioned so that a corresponding probe extends into a hollow interior of the shaft, wherein the probe remains stationary while the shaft rotates within the bore of the stator;
positioning the motor in a well;
in each of the magnetostrictive sensors,
generating an initial electrical signal in an electronic circuit;
conveying the initial electrical signal to an magnetostrictive transducer;

generating, using the magnetostrictive transducer, an initial acoustic signal in the probe corresponding to the initial electrical signal;

reflecting, from each of one or more reflection points in the probe, a corresponding reflected acoustic signal;

sensing, in the transducer, each of the reflected acoustic signals;

generating, in the magnetostrictive transducer, an induced electrical signal corresponding to each of the reflected acoustic signals;

conveying the induced electrical signals to the circuit;

determining timing intervals between one or more pairs of the initial and induced electrical signals; and determining temperatures at one or more locations in the probe and corresponding locations in the motor based on the timing intervals.

* * * * *